US010144197B2

(12) United States Patent
Lee

(10) Patent No.: US 10,144,197 B2
(45) Date of Patent: Dec. 4, 2018

(54) PRECIOUS METAL SHEET DISPLAY AND METHOD OF MANUFACTURING

(71) Applicant: John Kent Lee, Green Bay, WI (US)

(72) Inventor: John Kent Lee, Green Bay, WI (US)

( * ) Notice: Subject to any disclaimer, the term of this patent is extended or adjusted under 35 U.S.C. 154(b) by 107 days.

(21) Appl. No.: 14/818,916

(22) Filed: Aug. 5, 2015

(65) Prior Publication Data
US 2017/0036480 A1 Feb. 9, 2017

(51) Int. Cl.
| B32B 15/04 | (2006.01) |
| B32B 3/06 | (2006.01) |
| B32B 9/04 | (2006.01) |
| B32B 7/14 | (2006.01) |
| B32B 17/00 | (2006.01) |
| B32B 17/08 | (2006.01) |
| B44C 5/00 | (2006.01) |
| B26F 1/38 | (2006.01) |
| B44F 5/00 | (2006.01) |
| B44F 7/00 | (2006.01) |
| A47G 1/06 | (2006.01) |
| B32B 7/08 | (2006.01) |

(52) U.S. Cl.
CPC ............... *B32B 15/04* (2013.01); *A47G 1/06* (2013.01); *B32B 3/06* (2013.01); *B32B 7/08* (2013.01); *B32B 7/14* (2013.01); *B32B 9/041* (2013.01); *B32B 17/00* (2013.01); *B44C 5/005* (2013.01); *B44F 5/00* (2013.01); *B44F 7/00* (2013.01); *A47G 2001/0694* (2013.01); *B26F 1/38* (2013.01); *B32B 2250/44* (2013.01); *B32B 2307/4023* (2013.01); *B32B 2307/412* (2013.01); *B32B 2307/732* (2013.01); *B32B 2451/00* (2013.01)

(58) Field of Classification Search
None
See application file for complete search history.

(56) References Cited

U.S. PATENT DOCUMENTS

| 3,480,500 A | * | 11/1969 | Hotter | B41M 1/24 |
| | | | | 101/32 |
| 3,833,990 A | * | 9/1974 | Boccard | B21B 3/00 |
| | | | | 29/412 |
| 4,466,534 A | | 8/1984 | Dunn | |
| 4,631,847 A | | 12/1986 | Colin | |
| 4,889,748 A | | 12/1989 | Dudley | |
| 5,033,774 A | | 7/1991 | Benardelli | |
| 5,120,589 A | | 6/1992 | Morikawa et al. | |
| 5,626,937 A | | 5/1997 | Morikawa et al. | |

(Continued)

FOREIGN PATENT DOCUMENTS

| JP | 01263042 | 10/1989 |
| JP | 024593 | 1/1990 |

(Continued)

OTHER PUBLICATIONS

JP H1076799 Machine Translation via AIPN.*

(Continued)

*Primary Examiner* — Laura C Powers
(74) *Attorney, Agent, or Firm* — Michael Best & Friedrich LLP

(57) ABSTRACT

A precious metal sheet display includes a sheet of precious metal cut into a form, and a layer of ink on the sheet such that the ink, the metal, and the form together create a recognizable image.

15 Claims, 5 Drawing Sheets

(56) References Cited

U.S. PATENT DOCUMENTS

| | | | | |
|---|---|---|---|---|
| 5,979,097 | A * | 11/1999 | Moore | G09F 1/12 40/124.03 |
| 6,006,456 | A | 12/1999 | Hiromachi et al. | |
| 6,093,273 | A | 7/2000 | Lee | |
| 7,290,803 | B2 * | 11/2007 | Scarbrough | B41M 3/148 283/109 |
| D571,075 | S | 6/2008 | Yalinkaya | |
| 2003/0099827 | A1 * | 5/2003 | Shih | B32B 7/12 428/343 |
| 2003/0163938 | A1 | 9/2003 | Norton | |
| 2005/0241438 | A1 | 11/2005 | Humphreys | |
| 2006/0138009 | A1 | 6/2006 | Bozkurt | |
| 2010/0219095 | A1 | 9/2010 | Weill et al. | |
| 2011/0039042 | A1 | 2/2011 | Johansen et al. | |
| 2011/0250412 | A1 * | 10/2011 | Johnson | B41M 3/00 428/195.1 |
| 2013/0134698 | A1 * | 5/2013 | Mayrhofer | C09J 7/0296 283/81 |

FOREIGN PATENT DOCUMENTS

| | | |
|---|---|---|
| JP | 02153796 | 6/1990 |
| JP | 02251436 | 10/1990 |
| JP | 02251437 | 10/1990 |
| JP | 03288698 | 12/1991 |
| JP | 0490392 | 3/1992 |
| JP | 04125144 | 4/1992 |
| JP | 04307085 | 10/1992 |
| JP | 07225823 | 8/1995 |
| JP | 1076799 | 3/1998 |
| JP | 10258596 | 9/1998 |
| JP | 1110788 | 1/1999 |
| JP | 11110512 | 4/1999 |
| JP | 2000181353 | 6/2000 |
| JP | 2002298039 | 10/2002 |
| JP | 2007202692 | 8/2007 |
| JP | 2008268825 | 11/2008 |
| WO | 9916626 | 4/1999 |

OTHER PUBLICATIONS

The Creativity Exchange, "DIY Double Sided Glass Frames for Framing Shells or Dyes Sea Farms", Sep. 13, 2013; https://www.thecreativityexchange.com/2013/09/diy-double-sided-glass-frames-for-framing-shells-or-dyed-sea-fans.html (Year: 2013).*

Frame USA ("What are the Different Types of Picture Framing Glass?", Aug. 5, 2013; http://www.frameusa.com/blog/what-are-the-different-types-of-picture-framing-glass/ (Year: 2013).*

* cited by examiner

US 10,144,197 B2

PRECIOUS METAL SHEET DISPLAY AND METHOD OF MANUFACTURING

BACKGROUND

The present invention relates to collectible precious metal displays.

People have collected precious metals for centuries, typically keeping the units of precious metal secure in vaults, safes, or other locations generally hidden from public view. People have also collected art for centuries, often displaying the art in their homes or offices.

SUMMARY

The present invention provides a new mechanism for merging collectible precious metal and collectible art into a display that is visually appealing, that can be predominantly machine-produced, but with some component of hand-craftsmanship, and that is highly customizable, both in terms of the artistic image and the value of the precious metal. The precious metal is provided in a thin sheet (e.g., 2-10 mils thick), contains a layer of ink directly thereon, and can be cut to a recognizable shape. Together, the ink on the precious metal sheet, the exposed precious metal itself, and the recognizable shape of the sheet provides an artistic image that is attractive to the collector, but that also carries with it the intrinsic value provided by the quantity (i.e., weight) of the precious metal used.

In one embodiment, the invention provides a precious metal sheet display including of a sheet of precious metal cut into a form, and a layer of ink on the sheet such that the ink, the metal, and the form together create a recognizable image.

In another embodiment, the invention provides a printed precious metal sheet display including a sheet of precious metal cut into a form and printed thereon with ink such that the printing, the metal, and the form together create a recognizable image.

In another embodiment the invention provides a method of manufacturing a printed precious metal sheet display. The method includes printing ink directly onto a sheet of precious metal using an automated printing device and cutting the sheet into a form using an automated cutting device. The form, the ink, and the metal together create a recognizable image.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
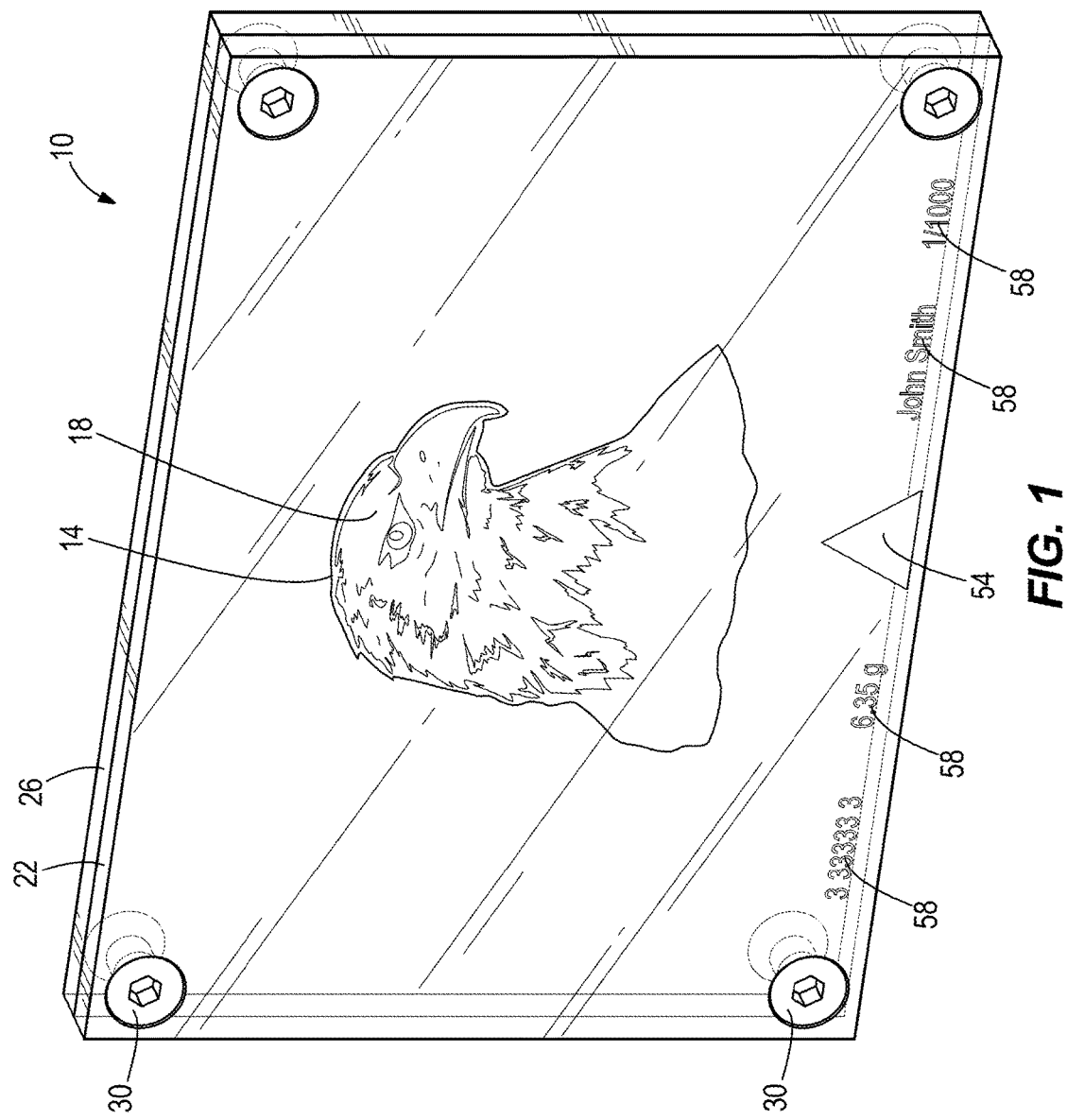
FIG. 1 is a perspective view of a printed precious metal sheet display embodying the invention.

FIG. 1 illustrates a printed precious metal sheet display 10 of the present invention. The display 10 offers both a mechanism for collecting precious metal, as well as a mechanism for displaying intriguing artwork formed in part by the precious metal.

Figure 2:
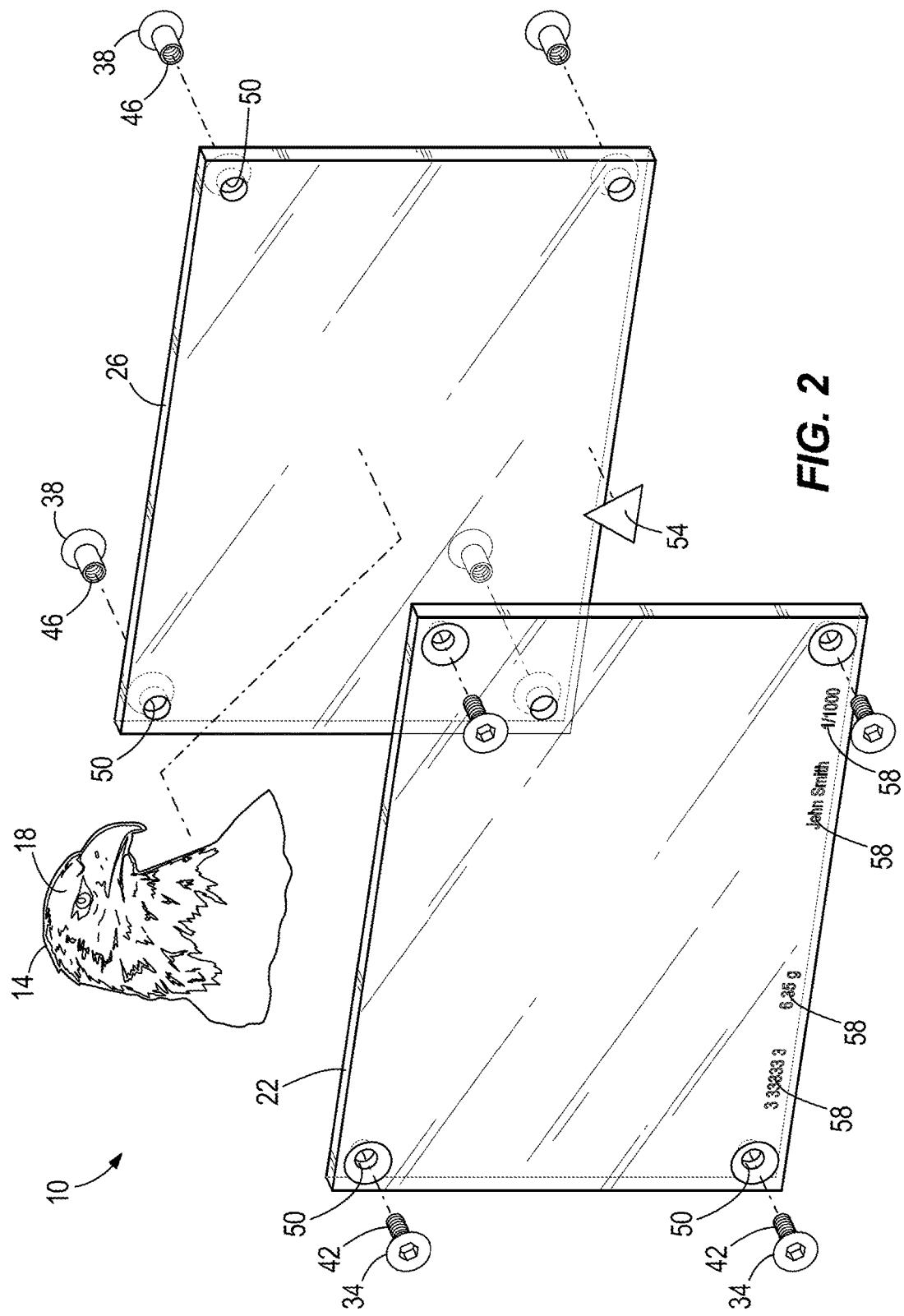
FIG. 2 is an exploded view of the printed precious metal sheet display of FIG. 1.

With reference to FIGS. 1 and 2, the printed precious metal sheet display 10 includes a sheet of precious metal cut into a form 14. The precious metal can be gold, silver, platinum, or any other desired metals that are commonly collected for their intrinsic value. The illustrated sheet is gold and has a thickness of between 2 mils and 10 mils, and can also range in thickness between 4 mils and 5 mils. The form 14 defines geometry or an outline of a recognizable object, such as the head of bird, and more specifically the head of an American bald eagle, as shown in FIG. 1.

A layer of ink 18 is applied or printed onto the form 14 to further characterize and provide artistic detail to the form 14, making the form 14 even more recognizable as the American bald eagle. In the illustrated embodiment, the layer of ink 18 is white in color to replicate the white feathers characteristic of an American bald eagle. In other embodiments, the ink 18 can be other colors, can be more than one color, and can be applied in multiple layers. The ink 18 can be applied by hand by the artist, or by an automated printing device as described below. The ink 18 can be applied to only one side of the form 14, or to both sides of the form 14. In the illustrated embodiment, the ink 18 covers less than 75% of a surface area defined by the side of the sheet form 14 on which the ink 18 is applied, and can also cover less than 50% of a surface area defined by the side of the sheet form 14 on which the ink 18 is applied. In this manner, the precious metal sheet form 14 defines part of the art by acting as a shaped canvas onto which the ink 18 is applied, but also by having a good portion of the underlying precious metal exposed to view (i.e., not covered with ink 18) to add to the overall artistic beauty.

The illustrated printed precious metal sheet display 10 further includes one or more layers of transparent material that can cover and protect the form 14 with the ink 18 printed thereon. As shown in FIGS. 1 and 2, a first layer of transparent material 22 covers a front side of the form 14 having ink 18 printed thereon, and a second layer of transparent material 26 covers a back side of the form 14, which may or may not have ink 18 printed thereon. In other embodiments, only a single layer of transparent material 22 could cover the front surface, while the back surface of the form 14 could be exposed or covered by a non-transparent layer. In the illustrated embodiment, the layers of transparent materials 22, 26 are high-quality optical glass of the type often used by museums to display artwork with optical clarity and reduced glare. The printed and cut form 14 is sandwiched between the first and second layers of transparent material 22, 26, thereby protecting the form 14 and also positioning it between the first and second layers 22, 26.

The layers 22, 26 are secured together via fasteners 30, which in the illustrated embodiment, each include a male portion 34 and a female portion 38. The male portion 34 has a threaded post 42 that is received in a threaded bore 46 of the female portion 38. The fasteners 30 are inserted into apertures 50 formed in the layers 22, 26, and can be tightened using a suitable tool (e.g., an Allen® wrench, screwdriver, etc.). For security purposes, the threads of the male portion 34 and/or female portion 38 can be treated with an adhesive to resist or otherwise prevent the fasteners 30 from being easily removed. The fasteners 30 can be selected to add to the overall artistic beauty of the display 10. The fasteners 30 can be made of material that is in the same color family as the precious metal used to create the form 14. For example, with the gold precious metal used for the eagle head form 14 of FIGS. 1 and 2, brass fasteners having a golden appearance can be used. Where the precious metal used for the form 14 is silver, white gold, or platinum, stainless steel fasteners with a silver coloring can be used. In other embodiments, the fasteners can include adhesives applied between the two layers 22, 26.

The display 10 can optionally include security means 54 provided on at least one of the layers 22, 26 and/or on the form 14. The security means 54, which as shown in FIGS. 1 and 2 is a security sticker intended to deter fakes, forgeries, and counterfeits, and to reassure the owners or collectors that the display 10 is a genuine piece from the original manufacturer. It can contain various technologies (e.g., overt and/or covert) that make duplication difficult. In other embodiments, other security means, including micro-chips and microscopic particles can be used in place of and/or in addition to the security sticker.

The display 10 can also include indicia 58 etched or otherwise applied to one or both of the layers of transparent material 22, 26. The indicia 58 can include information relating to the serial number or the unique product number of the display 10, but can also include other information (e.g., the weight of the contained precious metal, the artist's name and item number of a series) or other commentary or dedication. For example, the display 10 may be an award presented to someone for various achievements (e.g., anniversary, retirement, distinguished service, etc.) and those achievements can be conveyed in the dedication indicia. Such dedication indicia may be placed in desired locations on the layers of transparent material 22, 26.

The illustrated display 10 can stand freely on a desktop, shelf, or other support surface by virtue of the flat bottoms of the layers of transparent material 22, 26, or could be modified to hang from or otherwise mount to a wall or other vertical surface. Furthermore, the layers of transparent material 22, 26 could also include translucent portions that could add to the aesthetic beauty of the display 10, while having transparent portions to enable clear viewing of the form 14 with the ink 18 thereon.

Figure 3:
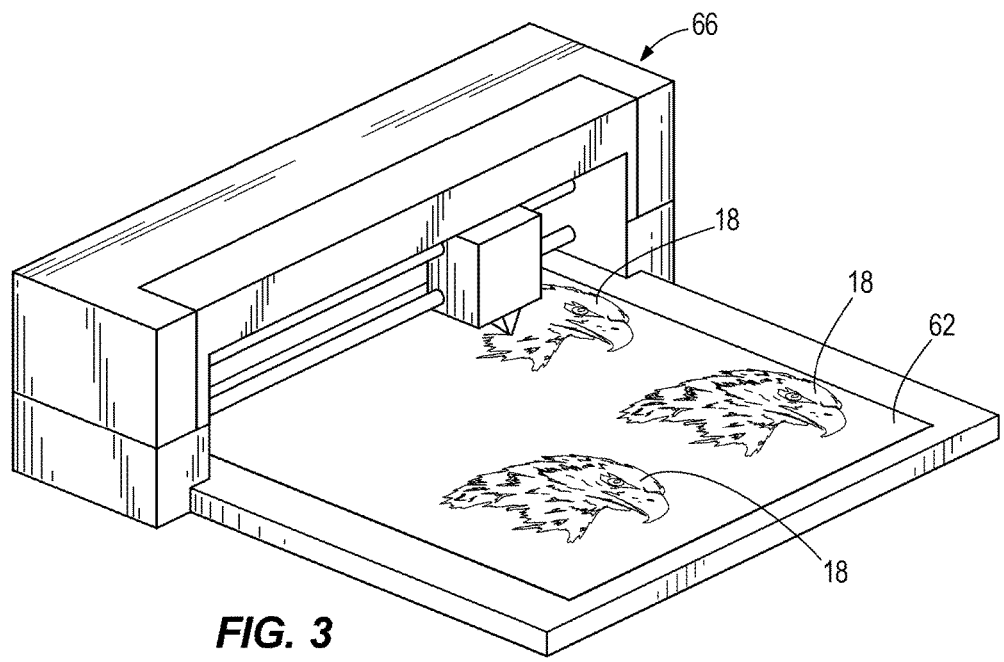
FIG. 3 illustrates the printing of ink onto an un-cut, initial precious metal sheet by an automated printing device.

One method of manufacturing the display 10 will now be described with reference to FIGS. 3 and 4. FIG. 3 depicts an initial sheet of precious metal 62 sized to permit printing of the ink 18 thereon by an automated printing device 66. In the illustrated embodiment, the initial sheet 62 is sized to eventually produce four of the cut sheet forms 14, although the initial sheet 62 could be larger or smaller, to yield more or fewer forms 14, depending on the printing device 66 used, the size of the forms 14, and other production parameters. In practice, the printing orientation can be optimized to maximize the forms 14 fitting on the initial sheet 62 (e.g., by nesting), and to minimize the amount of scrap or unusable precious metal 62. The design for the layer of ink 18 to be applied is stored in an art data file available for graphic design. The printing device 66, which in the illustrated embodiment is a UV inkjet printer, deposits and bakes the ink 18 onto the initial sheet 62 as directed by the art file. If printing is to be on both sides of the sheet forms 14, the other side of the initial sheet 62 can be printed in the same manner following the printing of the first side, using the appropriate opposite side art file. In some other embodiments, small jewels (e.g., diamonds, emeralds, rubies, etc.), stickers, or other decorative, non-ink materials can also be applied to the form 14. In other embodiments, the ink 18 can be applied by hand, or by other automated printing devices.

Figure 4:
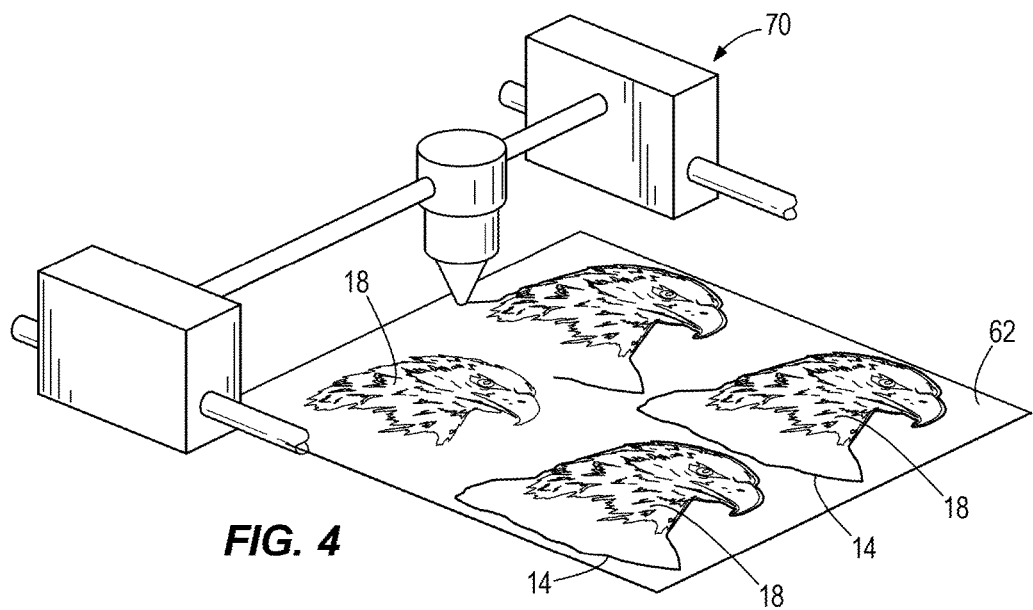
FIG. 4 illustrates the cutting of the initial precious metal sheet into forms by an automated cutting device.

With the ink layer 18 applied for the four sheet forms 14, the initial sheet 62 is moved to the automated cutting device 70, as shown in FIG. 4, where the four sheet forms 14 are cut from the initial sheet 62. In other embodiments, the forms 14 could be cut first and the ink 18 applied after cutting, however, that has not been found to be as practical for mass production. The illustrated cutting device 70 is a computerized numerical control (CNC) laser that is programmed with the appropriate cutting data file to cut the desired shape of the form 14. The cutting data file also dictates the weight of the precious metal, based on the thickness of the initial sheet and the size of the form 14. The forms 14 can be designed to achieve desired predetermined weights of the precious metal in order to produce displays having differing price points. Again, as shown in FIG. 4, four of the forms 14 are cut from the initial sheet 62. In other embodiments, the automated cutting device 70 could alternatively be other suitable cutting or stamping devices, however, it has been found that the illustrated CNC laser provides good cut quality requiring only a limited amount of manual clean-up of the cut edges.

After the four forms 14 have been cut from the initial sheet 62, any burrs, nicks, tears, etc. can be manually cleaned up using techniques and tools commonly used by jewelers in working with the respective precious metals. The scrap portion of the initial sheet 62 is salvaged and can be sold for its value as precious metal, or melted down and formed into a new sheet for manufacturing more forms 14.

Once the forms 14 are cut and the edges are cleaned, a form 14 is positioned between the two layers of transparent material 22, 26. The form 14 can be handled delicately using gloves, tweezers, suction devices, or other tools designed for such handling, and can be carefully oriented and positioned for sandwiching between the two layers 22, 26. Other automated processes can also be used. In the illustrated embodiment, no adhesive or other securing means is used to secure the form 14 directly to the layers 22, 26. Instead, the pressure created between the two layers 22, 26 due to tightening the fasteners 30 adequately secures and maintains the positioning of the form 14. However, in other embodiments, adhesives or other securing features could be used if the form 14 experiences undesirable shifting or movement between the layers 22, 26, or if only a single, front transparent layer is used.

The security means 54 can be coupled with one or both of the layers, or with the form 14, as desired. In the illustrated embodiment, the security sticker 54 is adhesively secured to an inside surface of one of the two layers 22, 26 so that it too is sandwiched between the two layers 22, 26.

The two layers 22, 26, with the form 14 sandwiched therebetween, are then secured using the fasteners 30 as described above. Again, adhesive can be applied to the fasteners 30 to inhibit removal of the fasteners 30. Prior to assembly, any desired indicia 58 can be etched or otherwise applied to one or both of the layers 22, 26. In the illustrated embodiment, a $CO_2$ laser is used to etch the indicia 58 containing information such as the weight of the precious metal, the unique identifier, serial number, item number of a series and any other information desired.

Figure 5A:
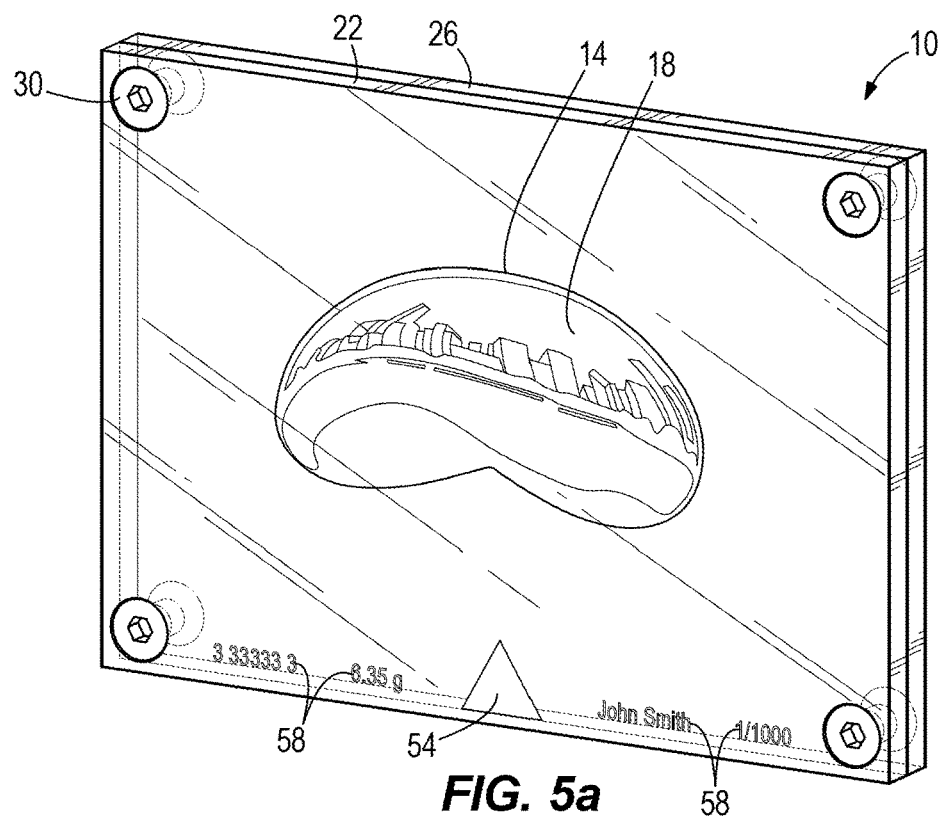
FIGS. 5a-c illustrate additional printed precious metal sheet displays embodying the invention.
Figure 5B:
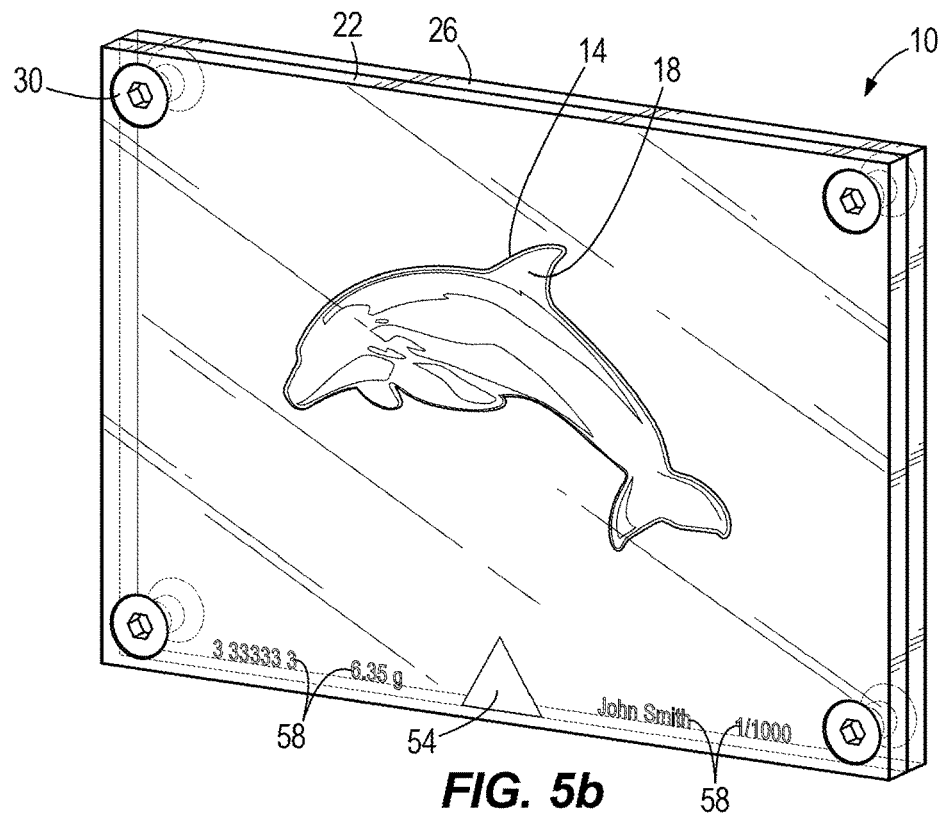
Figure 5C:
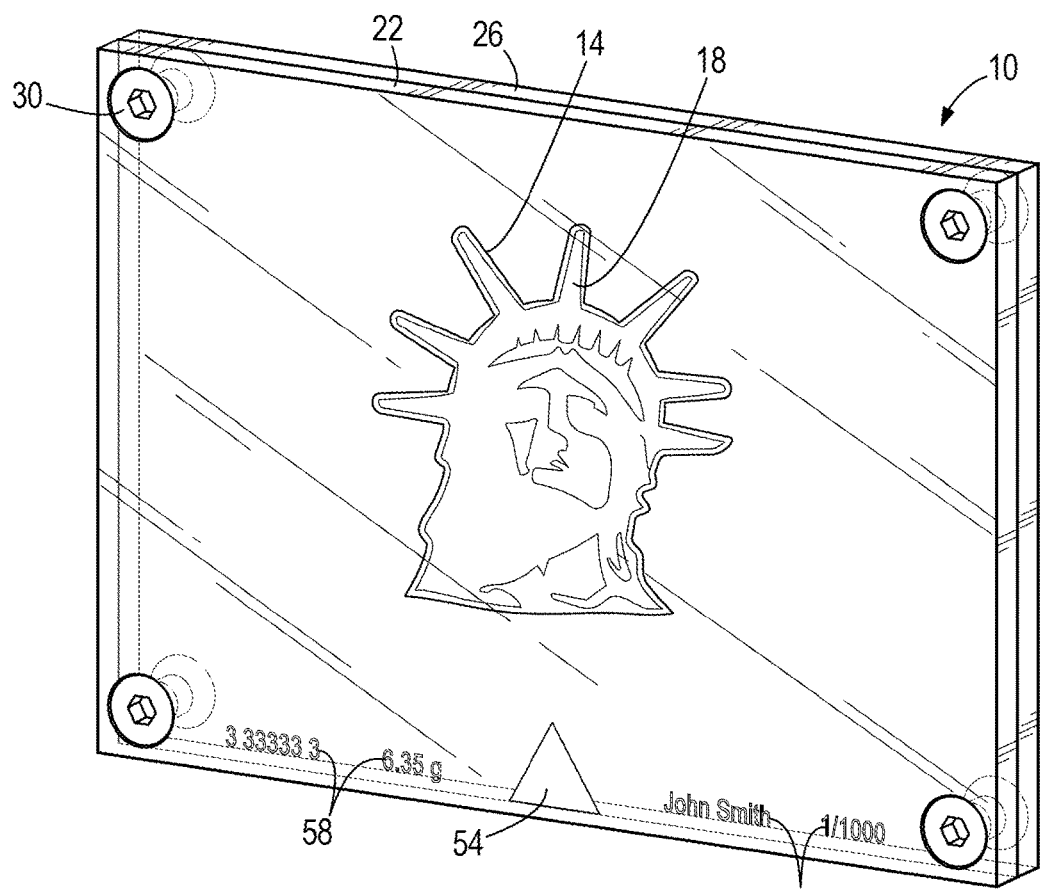

FIGS. 5a-c illustrate other examples of printed precious metal sheet displays 10, each with a different form 14 and printed ink layer 18 together defining different recognizable images. FIG. 5a illustrates an artistic image of the Cloud Gate sculpture in Chicago, which has been nicknamed "The Bean." FIG. 5b illustrates an artistic image of a dolphin. FIG. 5c illustrates an artistic image of the head of the Statute of Liberty. These are just a few examples of the types of iconic and publicly recognizable images that can be created using the forms 14 and the ink layer 18. Those of skill in the art can envisage any number of iconic buildings, landmarks, landforms, vehicles, tools, accessories, nature and wildlife, religious iconography, logos, and the like that could make a form 14 desired by a potential collector. Additionally, forms 14 could also be created to illustrate human portraits or caricatures.

Various features and advantages of the invention are set forth in the following claims.

What is claimed is:

1. A precious metal sheet display comprising:
    a sheet of precious metal cut into a form;
    a layer of ink directly on the sheet such that the ink, the metal, and the form together create a recognizable image; and
    a first layer of glass covering a first side of the sheet and a second layer of glass covering a second side of the sheet, the first and second layers of glass being secured together using fasteners extending through apertures in the first and second layers of glass to sandwich the sheet therebetween;
    wherein the sheet has a thickness of between 2 mils and 10 mils.

2. The precious metal sheet display of claim 1, wherein the ink covers less than 75% of a surface area defined by a side of the sheet on which the ink is applied.

3. The metal sheet display of claim 2, wherein the ink covers less than 50% of a surface area defined by a side of the sheet on which the ink is applied.

4. The precious metal sheet display of claim 1, wherein the form into which the sheet is cut defines an outline of a recognizable object.

5. The precious metal sheet display of claim 1, wherein the fasteners are treated with an adhesive to inhibit removal.

6. The precious metal sheet display of claim 1, wherein the fasteners are in the same color family as the precious metal.

7. The precious metal sheet display of claim 1, wherein at least one of the layers of glass has indicia thereon.

8. The precious metal sheet display of claim 1, further comprising security means provided on one of the layers of glass or on the sheet.

9. The precious metal sheet display of claim 8, wherein the security means is a security sticker.

10. A printed precious metal sheet display comprising:
    a sheet of precious metal cut into a form, the sheet having a thickness of between 2 mils and 10 mils;
    a layer of ink printed directly on the sheet of precious metal, the ink covering less than 75% of a surface area defined by a side of the sheet on which the ink is applied, such that the ink, the metal, and the form together create a recognizable image; and
    a first layer of optical glass covering a first side of the sheet and a second layer of optical glass covering a second side of the sheet, the first and second layers of optical glass being secured together without a frame and by fasteners extending through apertures in the first and second layers of optical glass to sandwich the sheet therebetween, each fastener including a male portion and a female portion, the male portion having a threaded post received in a threaded bore of the female portion.

11. The precious metal sheet display of claim 1, wherein the sheet has a thickness of between 4 mils and 5 mils.

12. The precious metal sheet display of claim 1, wherein the glass of the first and second layers of glass is optical glass.

13. The precious metal sheet display of claim 1, wherein each fastener includes a male portion and a female portion, the male portion having a threaded post received in a threaded bore of the female portion.

14. The precious metal sheet display of claim 1, wherein the first and second layers of glass are secured together without a frame.

15. The printed precious metal sheet display of claim 10, wherein the sheet has a thickness of between 4 mils and 5 mils.

* * * * *